(12) United States Patent
Guyot et al.

(10) Patent No.: US 8,676,909 B2
(45) Date of Patent: Mar. 18, 2014

(54) METHOD, SYSTEM AND ARCHITECTURE FOR DELIVERING MESSAGES IN A NETWORK TO AUTOMATICALLY INCREASE A SIGNAL-TO-NOISE RATIO OF USER INTERESTS

(75) Inventors: Paul Guyot, Paris (FR); Jean-Charles Campagne, Paris (FR)

(73) Assignee: Semiocast, Paris (FR)

( * ) Notice: Subject to any disclaimer, the term of this patent is extended or adjusted under 35 U.S.C. 154(b) by 0 days.

(21) Appl. No.: 13/377,610

(22) PCT Filed: Jun. 15, 2010

(86) PCT No.: PCT/EP2010/003676
§ 371 (c)(1),
(2), (4) Date: Dec. 12, 2011

(87) PCT Pub. No.: WO2010/149312
PCT Pub. Date: Dec. 29, 2010

(65) Prior Publication Data
US 2012/0102130 A1    Apr. 26, 2012

(30) Foreign Application Priority Data

Jun. 22, 2009  (EP) .................................... 09008171

(51) Int. Cl.
*G06F 15/16*    (2006.01)
(52) U.S. Cl.
USPC ............................ 709/206; 707/798; 705/319
(58) Field of Classification Search
USPC ......... 707/5, 749, 798; 709/206, 204; 705/14; 455/466
See application file for complete search history.

(56) References Cited

U.S. PATENT DOCUMENTS 5,577,028 A    11/1996 Chugo et al.
5,867,799 A    2/1999 Lang et al.
(Continued)

FOREIGN PATENT DOCUMENTS

| WO | WO9307566 A1 | 4/1993 |
|---|---|---|
| WO | WO 2007/076150 A2 | 7/2007 |
| WO | WO 2009/065052 A1 | 5/2009 |

OTHER PUBLICATIONS

Goldbeck, Hendler "Reputation Network Analysis for Email Filtering", Proceedings of CEAS' 2004. Dec. 31, 2004, XP002548641, Retrieved from the Internet: URL: http://www.mindswap.org/papers/Email04.pdf * the whole document*.

(Continued)

*Primary Examiner* — Dustin Nguyen (57) ABSTRACT

The present invention pertains to a method for delivering messages in a social network to increase a signal-to-noise ratio for the recipients of messages, characterized in that a process mechanism comprises of a diffusion process and a selection process combined through an adaptive process, in which:

the diffusion process dispatches each message through dynamic routing graphs defined between the sender user and a set of potentially interested recipient users;

the selection process locally filters the messages that are transmitted from sender users and received by potentially interested recipient users, according to the result of the application of a selection function on the metadata values constituting a message profile extracted from each transmitted message and weighted feature values constituting a user profile of the recipient to establish an estimate of interest for the user regarding each message, and the adaptive process continuously adjusts processing functions to adapt the graphs structure according to the user profiles dynamically updated by message metadata.

15 Claims, 3 Drawing Sheets

(56) References Cited

U.S. PATENT DOCUMENTS

| | | | |
|---|---|---|---|
| 7,013,238 B1 | 3/2006 | Weare | |
| 8,055,664 B2* | 11/2011 | Baluja et al. | 707/749 |
| 8,346,864 B1* | 1/2013 | Amidon et al. | 709/204 |
| 2005/0171954 A1 | 8/2005 | Hull et al. | |
| 2005/0177385 A1 | 8/2005 | Hull et al. | |
| 2007/0250500 A1* | 10/2007 | Ismalon | 707/5 |
| 2008/0046317 A1* | 2/2008 | Christianson et al. | 705/14 |
| 2009/0176518 A1* | 7/2009 | Doni | 455/466 |
| 2010/0241713 A1* | 9/2010 | Shimizu | 709/206 |
| 2010/0306271 A1* | 12/2010 | Shmueli et al. | 707/798 |
| 2011/0202606 A1* | 8/2011 | Agarwal et al. | 709/206 |

OTHER PUBLICATIONS

Goldberg David, Nichols, David et al. "Using collaborative filtering to weave an information Tapestry", Communications of the ACM Dec. 1992 v35 n12 pp. 61-70. Retrieved from the Internet: URL: https://www.ischool.utexas.edu/~i385d/readings/Goldberg_UsingCollaborative_92.pdf.

Lakshmi K. et al. "An Improved Feature Selection using Maximized Signal to Noise Ratio Technique for TC,", pp. 541-546, Third International Conference on Information Technology: New Generations (ITNG'06), 2006.

Krasser S. et al. "Identifying Image Spam based on Header and File Properties using C4.5 Decision Trees and Support Vector Machine Learning", Proceedings of the 2007 IEEE, Workshop on Information Assurance, United States Military Academy, West Point, NY Jun. 20-22, 2007 (see p. 257).

Stalder F. et al., "Open Source Intelligence", vol. 7, No. 6—Jun. 3, 2002 (see pp. 2 and 4).

Public Access Networks Corporation, "Using Procmail to Filter Your Email on Panix", http:// www.panix.com/help/mail.procmail.html, dated 2003-2005, last modified in 2008 (see p. 2).

Crocker David, "Standard for the format of ARPA Internet Text Messages", 1982, RFC822, Aug. 1982.

Berners-Lee Tim et al. "Hypertext Markup Language—2.0", 1995, RFC1866, Nov. 1995.

* cited by examiner

METHOD, SYSTEM AND ARCHITECTURE FOR DELIVERING MESSAGES IN A NETWORK TO AUTOMATICALLY INCREASE A SIGNAL-TO-NOISE RATIO OF USER INTERESTS

BACKGROUND AND PRIOR ART

The invention relates to a method for delivering messages in a social network that automatically increases a signal-to-noise ratio correlated to user interests, and to a system as well as to an architecture to implement such a method.

The invention field is the telecommunication area and, more particularly, message routing and data processing that adjust its internal parameters, such as its routing tables, throughput flow, . . . , in response to the content, metadata of transiting messages and user feedbacks. The invention can also be applied to recommendation systems.

The present invention relates to information processing for large or massive information networks, such as the Internet and mobile networks. These networks have considerably eased interpersonal communication and exchange of information entities between users. Nowadays, individuals access and receive a huge amount of information generated by other users, leading to an information overload problem.

The messages that are involved here flow through electronic messages, whether these are electronic mail, GSM short messages, messages posted on Internet websites, blogs or forums, instant messages and other means of electronic communication. Messages are explicitly addressed to recipients, as is the case with electronic mail, instant messaging and GSM text and multimedia messages, or published and made visible to a community or to everybody.

A new form of communication in computer networking emerged with the rise of social networks. With social networks such as "FACEBOOK.COM", "LINKEDIN.COM", "TWITTER.COM" or "FRIENDFEED.COM", users can send messages that are delivered to all the other users reciprocally or univocally—depending on the network—identified as their "friends" or "connections". The "friendship" relations constitute a "social graph" that connects users of social networks. The flow of messages distributed in a social graph is usually called the "feed", the "live feed", the "timeline" or the "social timeline" (hereafter "live feed") of the user or of the user's friends. A method to generate such a sequence is disclosed in the patent application published as WO 2007/076150.

On social networks, a user typically performs actions, such as installing an application, annotating a picture or a video, leaving a comment, changing information on their profile or their online résumé, or any other operation. These actions are described as an automatically generated message in plain English or in another natural language. The message is then enqueued in the "live feed" of the user, i.e. memorized in a list of messages, and made visible to their connected "friends". A user can also typically post a free form message that answers a question such as "What are you doing?" or "What are you working on?" or "What's on your mind?" or any other similar question, and this message is also enqueued in their "live feed". Sometimes, the message is constrained and must start by the name or pseudo of the user. Sometimes, the message must include a verb the user can select in a list of pre-defined verbs such as in "PLURK.COM" network.

Such "live feeds" aggregate a huge amount of messages and information, and it is difficult for individual users to read all the messages emanating from their "friends" or "connections". Besides, most messages are of little interest to individual users, because they relate to actions they have no interest in, or because the author of the message mentions something that does not interest all the recipients. Messages are often publicly available, and yet, the total amount of messages is such that it is difficult for users to access messages that may interest them from people outside their circle of "friends".

Then, the general problem is how to increase the signal-to-noise ratio of messages received by each user communicating in an open network, where the signal-to-noise ratio perceived by each user is correlated to the density of "interesting" messages a user can find in view of the received messages (such as mentioned topics, authors, mentioned users, . . . ), even if the user interests evolve over time.

The signal-to-noise ratio, when defined as the ratio of interesting information or messages (Nsignal) by uninteresting, unwanted or superfluous information or messages (Nnoise), can be increased by increasing Nsignal and/or decreasing Nnoise.

A solution to improve the signal-to-noise ratio by is to classify messages and to designate spaces or channels based on a topic or a common interest for messages to be published and exchanged. Users of systems based on this classification solution only read and write in channels that cover their interests. Systems based on this idea include instant messaging rooms or channels, including those created within social networks such as "groups", "rooms", web-based forums and "newsgroups" where topics are organized hierarchically. Such a solution increases the ratio by increasing Nsignal and decreasing Nnoise in designated spaces or channels.

All the embodiments of such delivery systems based on forums have several important limitations. Users must select the appropriate forum or forums to post their messages, which is no easy task since forums do not exactly match the users interests and topics of messages, as disclosed in Human Factors in Computing Systems, CHI '91 Conference Proceedings, pages 63-70, ACM Press, 1991. Besides, users must manually subscribe or visit regularly the most appropriate forums which they must manually select. Eventually, users only visit the forums for the few topics they are passionate about to avoid the information overload generated by messages coming from too many forums.

Another solution to improve the signal-to-noise ratio is to tag or annotate messages with metadata, which can be a keyword, a Boolean value or any other information. Users explicitly associate metadata to each message, and the metadata is used to filter the incoming messages for other users and to search for interesting messages. Such a solution increases the ratio by decreasing Nnoise by filtering unwanted messages, and by increasing Nsignal by allowing users to search for interesting messages. Systems based on this solution include collaborative spam filtering systems such as VIPUL'S RAZOR, rating systems, tagging systems, and collaborative filtering systems such as TAPESTRY, cf. Communications of the ACM, 35:61-70, 1992. Several users also annotate free form messages with conventional syntaxes grouped under the name of "microformats" and "nanoformats", as can be observed on social networks such as TWITTER.COM.

In all the embodiments of such annotation-based systems, delivery systems based on annotations have three important limitations. Messages must be manually annotated, which requires an important human effort and time, and this can only be applied in a situation where a small proportion of users who are ready to spend the time to annotate messages can do so to the benefit of the other users. This requires that messages are distributed to many users in such a way that each message will be annotated by at least one user. Secondly, messages must be annotated before they are distributed to users, and therefore annotation by some users to the benefit of other users is not suitable to situations where messages are delivered at once and in real-time to all recipients, as is the case with instant messaging. Finally, annotation is limited by the variety of vocabulary and of conceptualization among users.

Another solution to improve the signal-to-noise ratio is to provide simple rules to filter messages. Such a solution increases the ratio by decreasing Nnoise by filtering unwanted messages based on rules. For example, a social network such as FACEBOOK.COM allows its users to select the relative amount of messages based on their nature. A user can decide to receive more "group" messages than "picture" messages, or only "wall" messages.

Document of patent WO 9307566 describes a similar system where users can specify routing and selection criteria for incoming messages, and remotely update these criteria.

Filtering and delivery systems based on user profiles or user-defined criteria such as the system described in application WO 2009/065052, are a subset of rule-based filtering and delivery systems.

In most of their embodiments, rule-based filtering and delivery systems require that users manually define rules or parameters of the rules or criteria. Some rule-based filtering systems can suggest rules based on "over the shoulder" observations of the user's behavior, but those require a feedback from the user that may be difficult to obtain in a delivery system. Some rule-based systems such as the one described in application WO 2009/065052 can automatically improve the filtering and the targeting of messages by updating the rules (or the user profile) from explicit user actions such as clicks on advertisement URLs.

In all their embodiments, delivery systems using rule-based filtering have two important limitations. Rules are static until updated or validated by explicit user actions. Besides, efficient rules are difficult to design in a dynamic context, when little information about messages can be known in advance. For example, manually defined static rules based on message content or metadata would inefficiently filter messages in a multicast or broadcast communication system or when messages are coming from unknown users. Indeed, rules of a rule-based filtering system must explicitly or implicitly cover all possible messages.

Another solution to improve the signal-to-noise ratio in a delivery system is to use user feedback and aggregate it with other users feedbacks. Such a solution increases the ratio by increasing Nsignal by delivering recommended messages. This is used in adaptive recommendation systems such as the one described in U.S. Pat. No. 7,013,238 or the one on websites such as AMAZON.COM.

The recommendation systems are based on a set of information entities that can be recommended (products sold on a given website or websites that can be visited). Users select items in this set, for example by purchasing a product, visiting a web page or any other action, and the recommendation system establishes a profile for each user which is then compared with the profiles of other users. Comparison and aggregation of the profiles allow the recommendation system to recommend items to users.

U.S. Pat. No. 7,269,590 teaches the ability of a social network user to edit their basic profile by modifying the user-defined criteria such as, but not limited to age, gender, and interests. This user modification capability affects the social timeline, which is directly dependent on the user defined criteria.

In all the embodiments of recommendation systems, delivery systems using adaptive recommendation systems have two significant limitations. For recommendations to make sense, items that are promoted or recommended must receive a significant number of selections performed by users. As a consequence, the set of items being delivered must be significantly smaller than the number of selections performed by users. In most cases, this set grows slowly, and those systems cannot be applied to a flow of short-lived messages. Besides, like annotation, recommendation requires that few users perform selections, for example by buying a product or visiting a web page, before the items can be recommended to other users. As a consequence, recommendation systems cannot be applied to individual messages in the context of instant messaging where messages are received by all recipients synchronously.

Another solution to improve the signal-to-noise ratio in a delivery system is the use of user feedback that is aggregated at a group level. This is typically what is done in adaptive collaborative filtering systems such as the one described in U.S. Pat. No. 5,867,799. In all their embodiments, delivery systems using adaptive collaborative filtering have two significant limitations. First, users must belong to a group or "community", and this membership must be initially declared. This limitation is shared with forum-based delivery systems, as described above. Second, for the filtering to work, a sufficient number of users in each group must provide feedback for each distributed messages. This limitation is shared with annotation-based delivery systems, as described above.

Neural network-based routing U.S. Pat. No. 5,577,028 describes an adaptive routing system for use in a multimedia integrated network. Common aspect with the current invention includes the realization to adaptively route messages/information according to some criteria. However the goal sought and the method are very different.

The technique described in U.S. Pat. No. 5,577,028 seeks to optimally distribute packets of information based upon some criteria. This involves computing some parameters so that the system behaves optimally. The current invention does not seek to deliver packets of information in an optimal fashion, as along an optimal route, but aims to deliver messages so that the signal-to-noise ratio perceived by users receiving the messages is increased.

Moreover one of the specificities of the invention described in said patent is the use of neural networks in the routing nodes. The current invention does not depend on the use of neural networks in routing nodes.

Another solution to improve the signal-to-noise ratio is the individual manual redistribution of messages. Such a solution increases the ratio by increasing Nsignal by delivering more interesting messages. Users decide to resend a message that they like to other users. This typically happens in electronic mail (forwarding) and on social networks such as TWITTER.COM ("retweeting"). However this method is far from being optimal. Manual redistribution has three significant limitations. First, it increases the amount of traffic. Secondly, it usually generates more noise, especially when messages are received several times. This happens in social networks where users cannot easily specify the set of recipients of the redistributed messages and broadcast the message to all their "friends", and in any situation where users incorrectly believe that the recipients might be interested in the re-distributed message, as can be observed in electronic mail systems (cf chain letters). Finally, it is slow, as it requires human effort. As a consequence, when information is delivered, it may be outdated.

Systems that seek to optimally distribute packets of information have the following limitations. Determining the correct values of the parameters needed to perform optimal delivery is very time and resource consuming. Moreover, the function to be optimized cannot always be formulated in such a way that is it usable.

NEAREST PRIOR ART

Another solution to improve the signal-to-noise ratio is presented in patent application published as US 2005/0171954 A1, entitled "Selective electronic messaging within an online social network for spam detection", which describes a method, apparatus, and system that are directed towards communicating a message within a social network based, in part, on user-defined criteria. The described system is an extension of simple rules filtering systems described above, and as such mostly increases the signal to noise ratio by decreasing Nnoise. This system includes a selection process that locally filters spam messages with user-defined criteria. However, unlike other spam filtering systems, the described system does not include an adaptive process: filtering criteria are manually updated by the social network user.

Most importantly, the described system can also theoretically increase the signal to noise ratio by increasing Nsignal. Indeed, users send messages by first manually providing addressing criteria, such as a degree of separation or a more complex search query such as "female members of a dating activity that are between a particular age range and identified income range" [0067]. The system then provides a list of matching recipients and users manually select who they want to send their messages to.

However, in the context of modern social networks, this solution does not significantly increase Nsignal and it can even increase Nnoise. Users must define a set of addressing criteria that matches potentially interested recipients. Since selection is to be performed manually, the main difficulty is to define a set of criteria to get a manageable list of potential recipients to select from. Indeed, modern social networks can be extremely large (hundreds of millions of users), and generic search queries or user-definable criteria can match a very large number of potentially interested recipients. If users send their messages to too many recipients, they might increase Nnoise by reaching users who are not interested. If the embodiment restricts the number of potential recipients, users might eventually define criteria that are so restrictive that this system does not really increase Nsignal when compared to traditional messaging systems in social networks.

More generally, this solution supposes that users can explicitly define addressing criteria that will increase the signal to noise ratio. Besides, it only applies to social network messaging where sender users explicitly declare the list of recipients, and not to social network messaging as found on LINKEDIN.COM, TWITTER.COM or FACEBOOK.COM groups and fan pages, where users broadcast messages to an implicit set of recipients, shall they be their "friends", their "contacts", their "followers" or the subscribers of lists or groups they are members of.

DISCLOSURE OF THE INVENTION

The present invention aims to overcome the drawbacks and limitations of the prior art by improving the signal-to-noise ratio in the context of multicast communication where many messages that transit can be considered as noise by recipients when compared to other messages that also transit.

The objective is then to automatically deliver messages in a way that yields a greater, robust to changing interests, signal-to-noise ratio for each individual recipient, in systems where users can send and receive unicast and multicast messages, and where messages are emitted by a significant proportion of users.

To reach this objective, the present invention takes into account that social networks are considered as a means of communication and as a source of information. However as said systems rely on the concept of "subscription" ("followers", "friends", etc. . . . ), they tend to have a structure similar to communities, they also tend to be relatively static in their structure, and make it very difficult or impossible to access information outside one's declared community (or "friends" or "contacts"). The information transits primarily among people inside a community. A key aspect of the present approach is to provide an automatic tool for distributing, finding and filtering information in order to overcome the rigidity of social networks and forums alike, which are based on the concept of "friendship" and on classifications of topics.

The invention is based on optimizing the overall estimated interest of received messages by combining a controlled diffusion of messages, through distributed and interconnected machines and/or processing units, to a set of potentially interested recipients chosen on a basis of features extracted from messages, and a selection process on each recipient end, based on correlating features of the messages and the recipient profile. This approach is dynamic since changing and new features are taken into consideration over time.

More specifically, the object of the invention is a method for delivering messages of the type above presented to increase the signal-to-noise ratio for the recipients of messages, wherein a process mechanism comprises a diffusion process and a selection process combined through an adaptive process, in which:
  the diffusion process dispatches each message through dynamic routing graphs defined between the sender user and a set of potentially interested recipient users;
  the selection process locally filters the messages that are transmitted from sender users and received by potentially interested recipient users, according to the result of the application of a selection function on the metadata values constituting a message profile extracted from each transmitted message and weighted feature values constituting a user profile of the recipient to establish an estimate of interest for the user regarding each message, and
  the adaptive process continuously adjusts processing functions to adapt the graphs structure according to the user profiles dynamically updated by message metadata.

By increasing an estimate of interest for each received message and selecting—i.e. decreasing—the total number of received messages, the signal-to-noise ratio increases since it can be represented by the ratio of the sum of the estimates of interest for received messages by the total number of the messages effectively received (see definition).

According to particular embodiments:
  the set of potentially interested users is a superset of the set of users to whom the message is explicitly addressed. It is defined as any union of the following sets: the set of users to whom the message is explicitly addressed, the set of the declared friends or followers of sender user, the set of users who interacted with sender user, the set of users who sent messages received by sender user, the set of users explicitly mentioned in the message, the set of users who sent messages mentioning topics mentioned in the message, the set of users who declared an interest for topics mentioned in the message, the set of users who are located nearby sender user, the set of users who favored the sender user or one of their messages, the set of users who have friends in common with sender user;

the diffusion process dispatches messages according to at least one diffusion feature extracted from said message in a pre-process phase;

diffusion features characterizing the propagation of a message are chosen between at least user identity and message topic;

the routing graphs are composed of distinct and interconnected routes where the messages transit;

features, feature values and weighted feature values are derived from messages metadata comprising at least language, user identity and topic values.

the selection function returns a scalar value and the selection process filters messages for which the selection function returns a value greater than a threshold value; as a result, the selection process maximizes the average of the result of the selection function for messages eventually transmitted to users;

the selection function is based on an inner product between a message vector based on metadata as coordinates extracted from the message profile space and a user vector based on weighted feature values as coordinates of the user profiles space, the maximization being achieved by selecting the inner product values greater than a threshold value;

a preliminary phase of the selection process consists in deleting blockage and incompatibility configurations between the message and user profiles;

a feature value in the user vector can be chosen between user identity, topic and language;

the weighted feature values of the user profile can be pairs of values classified in at least two lists comprising feature values and weighted feature values associated with a corresponding feature value;

the message profile extracted from the message comprises values of metadata chosen between at least one list of weighted feature values, a list of users identified in the message, a unique login of the sender user, of the former message in connection with the current message and of the primary message of linked messages, a sequence of characters to identify the terminal—mobile, computer, smartphone, etc.—or software configuration used to send the message and the network on which the message is transmitted, the time of the message, Boolean information to indicate the confidentiality degree of the message and its accessibility in another network;

at least two types of graphs are used, a topic graph and a user graph: the topic graph diffuses messages according to topics mentioned in the messages and the user graph diffuses messages according to the relationships between users as recorded in user profiles;

the graphs are modified according to changes in the messages content and changes in message flows, thus contributing to route dynamically the messages through the graphs;

the adaptation process can occur at user level when the user profile and the user selection process are updated, and at the network level when the graphs are modified;

a route is created between two users when the rate of messages exchanged between them is greater than a predetermined threshold;

the selection process bufferizes messages when they arrive;

the selection process accumulates the messages and determines whether to distribute or not a message to the user;

the adaptive selection function has three outcomes:

the message can be discarded, and if received again later it will be discarded as well, as a result, the user will not receive the message unless the user profile is updated to permit the distribution of the message;

the message is only delivered once and discarded if received again;

the message can be put on hold, and if received again, the adaptive selection process will consider feature values and metadata included in all instances of the message;

the adaptive process updates the profile of the recipient user regardless of the outcome of the selection process, i.e. whether the message was transmitted or not to the user;

adaptation process occurs at user level when the user profile and the user selection function are updated, and at the network level when the graphs are modified according to changes in messages flows and updates of user profiles.

The present invention is also related to a system able to implement the method for delivering messages as above defined.

Such a system comprises two types of addressable network nodes: diffusion feature nodes and user nodes. Messages are diffused through routing graphs that link sender user nodes, feature nodes and potential feature nodes to potential recipient user nodes on which messages are filtered.

The routing graphs are dynamically adapted to involve updated features nodes and new feature nodes created from message profiles extracted from newly transmitted messages with a pre-process tool.

In preferred embodiments:

the feature nodes can be created/destroyed when topics appear/disappear in the flow of messages;

user nodes can be created and destroyed as users respectively log in and log out of the network;

a message may be received by several recipient user nodes several times;

routes can be dynamically determined by the local processing of the message in each node;

each node processes incoming messages and selects which nodes messages are forwarded to, thus emphasizing the dynamic effect;

links in routing graphs can be created/destroyed when a user displays/undisplays interest in a topic or another user;

links in routing graphs are created or respectively destroyed when a feature value or a weighted feature value in a user profile raises above a predetermined threshold or respectively decreases below a predetermined threshold;

the feature nodes used for diffusion of messages are user nodes and topic nodes;

a selection feature used in the selection process at the recipient user nodes is chosen between the language and the topics mentioned in the messages;

the continuously adjusted processing functions, which achieves the selection process to determine whether the messages are forwarded to users, can be located at their associated user node;

nodes enrich the messages with metadata derived from the local computation of processing functions;

a message can be distributed to a user node several times, can follow different routes starting from the same sender user node and ending at the same receiver user node, and can be distributed to several user nodes.

Advantageously, the combination of the following dynamic adaptive tools of:

updating the profile of the sender user updating the connections of user nodes with feature nodes     updating the connections of user nodes with other user nodes     adaptive local routing of messages     updating the profile of the recipient users and     adaptive selection of messages, permits the delivery of messages according to automatically identified user interests, and improves the signal-to-noise ratio compared with a static graph combined with a selection function. It also allows users to receive messages coming from senders they are not initially connected with, and reciprocally allowing users to reach recipients they do not know.

The system may be increased (or diminished) by adding (or removing) a routing graph, or changing the user selection function.

Furthermore, the present invention presents the main advantages deriving from the aforementioned combination of the adaptive tools.

First, the nodes can be distributed on distant units and the delivery system easily scales, making it possible and easy to process a huge flow of messages.

Second, the adaptive property of the graphs that connect user nodes decreases, by a magnitude, the computation cost of message selection according to identified interests of users. As a result, the invention makes it possible to deliver instant messages between users that are not connected with a declared or implied social graph in any situation where the number of users and the rate of messages is significant.

Furthermore, as the system determines the user profiles, one can outline malicious behaviors such as spammers. Also, as the system prevents the diffusion to all users, spamming is difficult to achieve.

Moreover, the system can automatically identify the interests of users. A representation of these interests can be extracted and exploited to deliver precisely targeted advertising messages or to reach users with specific interests.

Finally, as the system generates over time user profiles dynamically, these may be used for outlining trends, correlations . . . which can possibly be exploited commercially.

The invention also relates to an architecture for delivering messages comprising means to access to the afore-described system as interfaced with other platforms and external information sources in a general telecommunication system.

To clarify the vocabulary and determine its extent in connection with the invention in the context known by a person skilled in the art, the following definitions and implementations are specified:

Features and Features Nodes:

Features (e.g. language, topic, user, date, etc.) and feature values (language in French, English, Spanish, etc.) for a given feature are extracted from a message and addressed to a feature node with an automatic process. An extraction process can happen at different stages: when the message is being sent by the sender, when it transits in different features nodes of the different graphs or when it is transmitted at the possible receiver user node before being actually delivered to the user.

Each value of each feature can be represented by an addressable network entity called a feature node.

Graph:

The graphs are diffusion networks based on said nodes. Any routing system (mails, IP packets, etc.) constitutes in a whole a network that connects each node, as servers, MTAs and MUAs for e-mails, IP routers in case of IP packets routing: such a network is called "graph".

Messages:

Users can send two kinds of messages: "private" messages to one or several recipients they select beforehand and "public" messages that are delivered to recipients determined by the system. Public messages can additionally be addressed to one or several recipients designated by the sender.

Messages include metadata. Metadata consists in context-based information, for example describing where the message is sent from, when it was sent, what the user was doing, and information extracted from the message with the computer tool mentioned above. Metadata are added to the message at creation time or when the message transits through the system. Metadata covers but are not limited to what is commonly known as message headers and message annotations.

Message metadata values refers to the features values composing message metadata. The set of message metadata values constitute the message profile. These feature values are used in the diffusion process for the routing and in the selection function at the receiver user node.

When a public message is sent from the sender user node, it is dispatched to the diffusion graphs according to the available feature values in the metadata of the message. If required, a connection is established from the user node of the sender to these feature nodes. If feature nodes do not exist, they are spawned.

When a feature node receives a public message, its internal state is updated with information included in the message. A propagation function based on this internal state and the feature values of the message computes a subset of the set of other nodes this node is connected to. The message is then forwarded to this subset.

When the sent message is private, if required, a connection is established from the user node of the sender to the user node of the recipients, and the message is forwarded to these nodes only.

Node:

A node of a graph establishes a bi-directional connection to another node, sends and receives messages through a connection, and closes an established connection. A node may contain processing units (software or hardware) and has an internal state. Nodes according to the invention are based on the notion of clients/servers for processes connected by TCP/IP sockets, "Mail Transfer Agents" or MTAs and "Mail User Agents" or MUAs, or Erlang/OTP processes as described in INAP'96, the 9th Exhibition and Symposium on Industrial Applications of Prolog, pages 16-18, 1996. Such nodes can also be construed as being attached to a virtual machine on a cloud.

According to the invention, nodes can be created and destroyed, <<spawned and pruned>>, as needed. For example, each node can be an Erlang/OTP process and distributed on several Erlang/OTP virtual machines. They can be created by the node local manager and destroyed as needed. Nodes can also be UNIX processes distributed on different servers and can be created by the UNIX fork function via a manager or a synchronization mechanism, and can be destroyed by the UNIX exit function (self-destruction) or killed by the UNIX kill function.

Route:

A route is the path followed by a message in the graphs. It consists of the list of nodes in which a message transits. A single message may follow several routes, thus the message may arrive at the user node several times. The route begins at the sender user node and ends at a recipient user node. Routes result from the succession of these local diffusion processes.

Selection Function:

At each user node, the transmitted message is processed by a selection function that is maximized to determine whether the message should be transmitted to the receiver according to the invention, based on the user and receiver profiles and on the message features.

Signal-to-Noise Ratio:

For each user, the signal-to-noise ratio is an increasing function of the sum of the user interest estimates in the received messages and a decreasing function of the total number of the received messages, i.e. a ratio of these quantities.

Updating Profile and Features:

The feature values and additional information are used to update the profile of the sender user using an update function. For any feature information extracted from the message, the update function modifies the profile of the user accordingly.

The users profiles are regularly updated, and as a result, connections between user nodes and between user nodes and feature nodes can be pruned. Nodes with no connection can be pruned as well. In the end, this results in changing the outcomes for the possible routes for a message in the future.

The recipients can provide feedback on a given message. This feedback is processed to update the profile of the user and is propagated backwards to the nodes related to the message, including the user node of the sender. Eventually, feedback information is delivered to user nodes that update the profile of the users accordingly.

User Node:

Each user is represented by an addressable network entity called a user node. User nodes can be feature nodes if users are one of the selection features. Each user node comprises the messages emitted and delivered to this user and the profile of the user.

User Profile:

Each user is associated with a profile which is part of the internal state of their user node. According to the invention, the profile is a set of information on the user, on its activity, in regards to specific features. The exact representation used for the representing the information depends on the type of the information (for example: estimation for the topic 'jogging', confidence in the estimation). Other type of information can be represented as a binary value (for example: user Joe is blacklisted: "{user_joe, blacklist=true}", . . . ).

When a user is registered, an initial profile is constructed from information the user may or may not provide, such as: birthdate, location, possession of a blog, other users he may know on the system, etc.

PREFERRED EMBODIMENT IN REFERENCE TO ENCLOSED FIGURES

The invention is now described according to non binding embodiments in connection with enclosed figures which represent, respectively.

Figure 1:
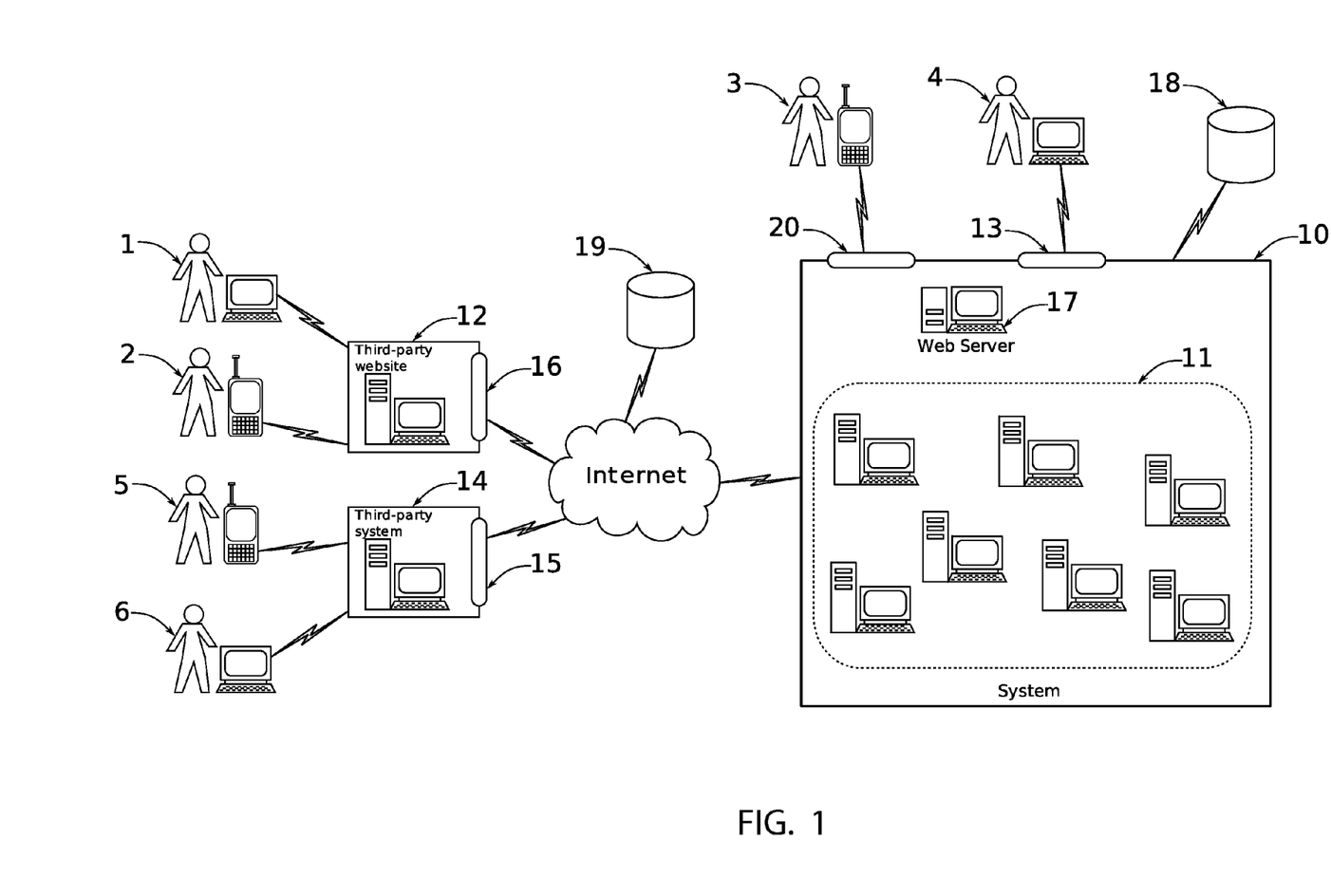
FIG. 1, an architecture for delivering messages to access a system according to the invention by interfacing platforms and direct users in a telecommunication system.

FIG. 1 depicts an architecture using a system 10 for delivering messages in a general telecommunication system, according to the invention. The message delivery system 10 is interfaced to existing service platforms such as social networks 12 and 14: "TWITTER.COM", "FRIENDFEED.COM" or "FACEBOOK.COM" or a blogging or micro-blogging system; such networks propose API web interfaces 15, 16 to allow other systems as the system 10 to give access to users 1, 2, 5 and 6 information or their messages.

The system 10 is also interfaced to external information sources 18 and 19, such as news websites, online reference sites, and directly to users 3, 4 via appropriate API web interfaces 13 and API mobile interfaces 20.

Thus, the system 10 is accessible via a web server 17 for networks and API interfaces 13 and 20 for the other interfaces as mobile phones.

A user can transmit messages via networks 12, 14, or directly via the API 13 or 20 with a mobile or a software client/editor. Messages transit through servers 11.

Figure 2:
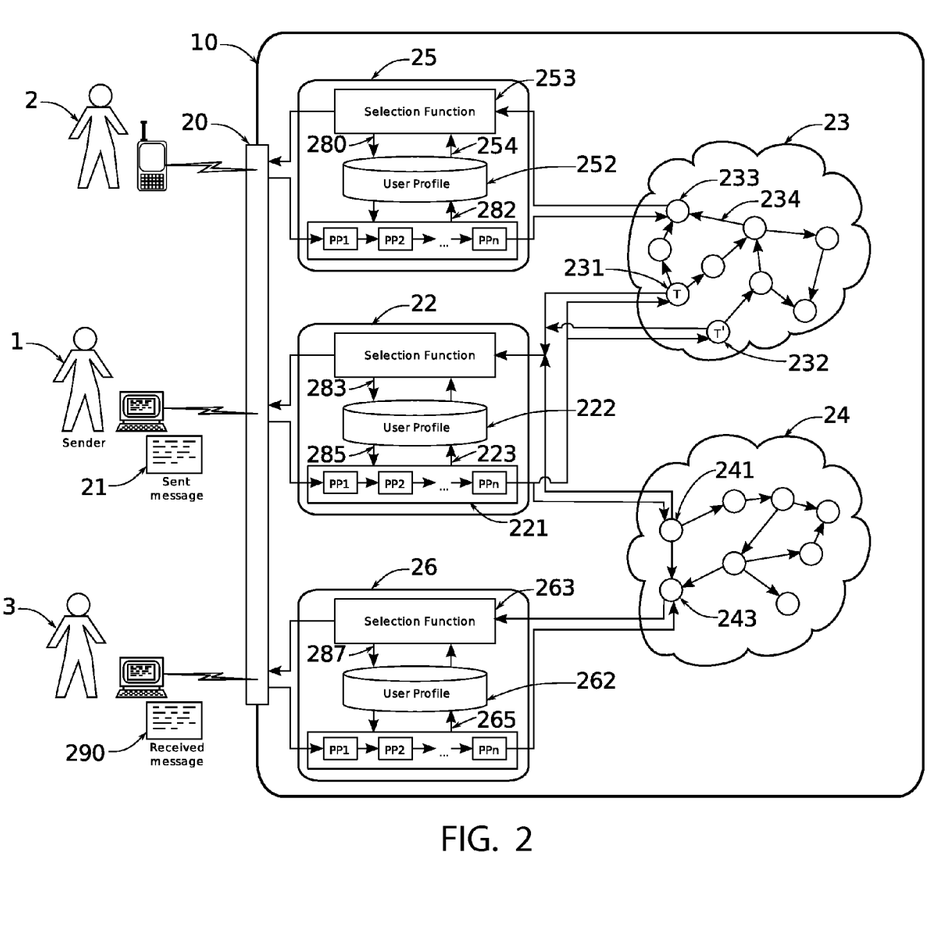
FIG. 2, a general diagram of a system for delivering messages in connection with users comprising a pre-processing mechanism and a selection function according to the invention.

The general diagram of FIG. 2 outlines the main processes of the system 10, the diffusion, selection and adaptive processes.

In the illustrated example two graphs are implemented, a "topics" graph 23 and a "social" graph 24 measuring the affinities between users. Users 1, 2 and 3 access the system 10 through the interface 20.

Each message 21 from a user 1 is collected by a user node 22. The message 21 is first pre-processed in a pre-process phase implemented by a pre-process tool 221 composed of modules PP1 . . . PPn. In this example, the language and the topic identification are achieved at this stage.

For the first feature, a computer tool extracts feature values from the message in the pre-process module PP1 to generate a list of pairs for each considered language with a statistical method.

The features used to process the message may be the following:

the natural language the message is written in;
the time the message was sent;
the class of the message, whether this message is public or private;
the source of the message: whether the user used the system 10 of the invention, another service such as "Twitter", "Friendfeed", "Facebook" (as shown in FIG. 1: Networks 12 or 14);
the interface used to send the message: more specifically which client the user used, either the main web site (shown in FIG. 1 as web Server 17) or API interfaces (shown in FIG. 1 as interfaces 13 and 20);
whether the message is a reply to another message, and the author of the original message if any;
the sender of the message, as included in the metadata;
the declared recipients of the message, if any;
the users mentioned in the message, if any;
the topics mentioned in the message, if any;
the tags specified by the sender user using a syntactic convention, if any;
the URLs mentioned in the message, if any.

The pre-processing modules PP1 . . . PPn use information from a user profile 222 through connection 285 and enrich the message with metadata. In the illustrated example, the pre-processing tool determined that the message 21 is related to topics T and T' and mentions user 3. The message is then diffused through the topic graph 23 via topic nodes 231 and 232 related to topics T and T' respectively, and through the social graph 24 via user node 241 related to user 1.

Following the topic graph 23, the message 21 reaches the topic node 233 and is then delivered to user node 25 related to user 2. The message is then processed by the corresponding dynamic selection function 253. The selection function uses features extracted from metadata of the message and information from user profiles 222 and 252 of users 1 and 2, respectively obtained from connections 285 and 254. Depending on the outcome of the selection function, message 21 is or not, as illustrated in this example, forwarded to user 2.

The message 21 also reaches the user node 243 of user 3 through several routes in the social graph 24. Indeed, advantageously, a message can be received several times by a given recipient user node. The message is processed by the dynamic selection function 263 and, in this example, it is forwarded to user 3 enriched with metadata as message 290.

The user nodes accumulate incoming messages and determine whether to distribute or not a message to the user by computing the selection function based on the profile of the recipient user 2 or 3, information from the profile of the sender user 1 included in the message metadata, feature values and any information that can be extracted from the message metadata, for instance:

features: language, topic, contact, etc.
feature values: code language (English: en, French: fr), topic concept, contact identity, etc.
complementary information: declared or guessed language, statistical confidence weight, topic concept weight, etc.

The maximization of the selection function is then dynamically achieved by depending on the triplet: features, features values extracted from the message and its metadata, and complementary information that weights the feature values. For example: representing the information "the user likes messages dealing with the topic 'jogging' with an estimation of 7.5 on a scale of 10, with a confidence of 1.3" as {"jogging", 7.5, 1.3}.

The dependency is implemented by a computer calculating tool.

Then, the adaptive selection function has three outcomes:
the message is discarded, and if received again it will be discarded as well, as a result, the user will not receive the message unless the user profile is updated in such as way that it permits the distribution of the message;
the message is only delivered once and discarded if received again;
the message is put on hold, and if received again, the adaptive selection process will consider feature values and metadata included in the previous instances of the message.

An advantageous embodiment of such a dynamic selection function is disclosed hereinafter, in reference to FIG. 3.

If $<<Us>>$ is the users space and $<<Ts>>$ the topics space, a selection features space $<<E>>$ is defined by $Us \times Ts$. Two types of selection vectors are implemented:
a selection vector $<<u>>$ of a user profile 31, defined on space E and based on weighted features values of user 3 as coordinates; and
a selection vector $<<v>>$ of a message profile 38, also defined on space E and based on features extracted— through pre-processing module 33—from metadata of said message 34 sent by user 1 and from the user profile 32 of user 1, as coordinates.

A dot product $<<u.v>>$ is then defined on space E and normalized in such a way to stand in the range [0,1].

Figure 3:
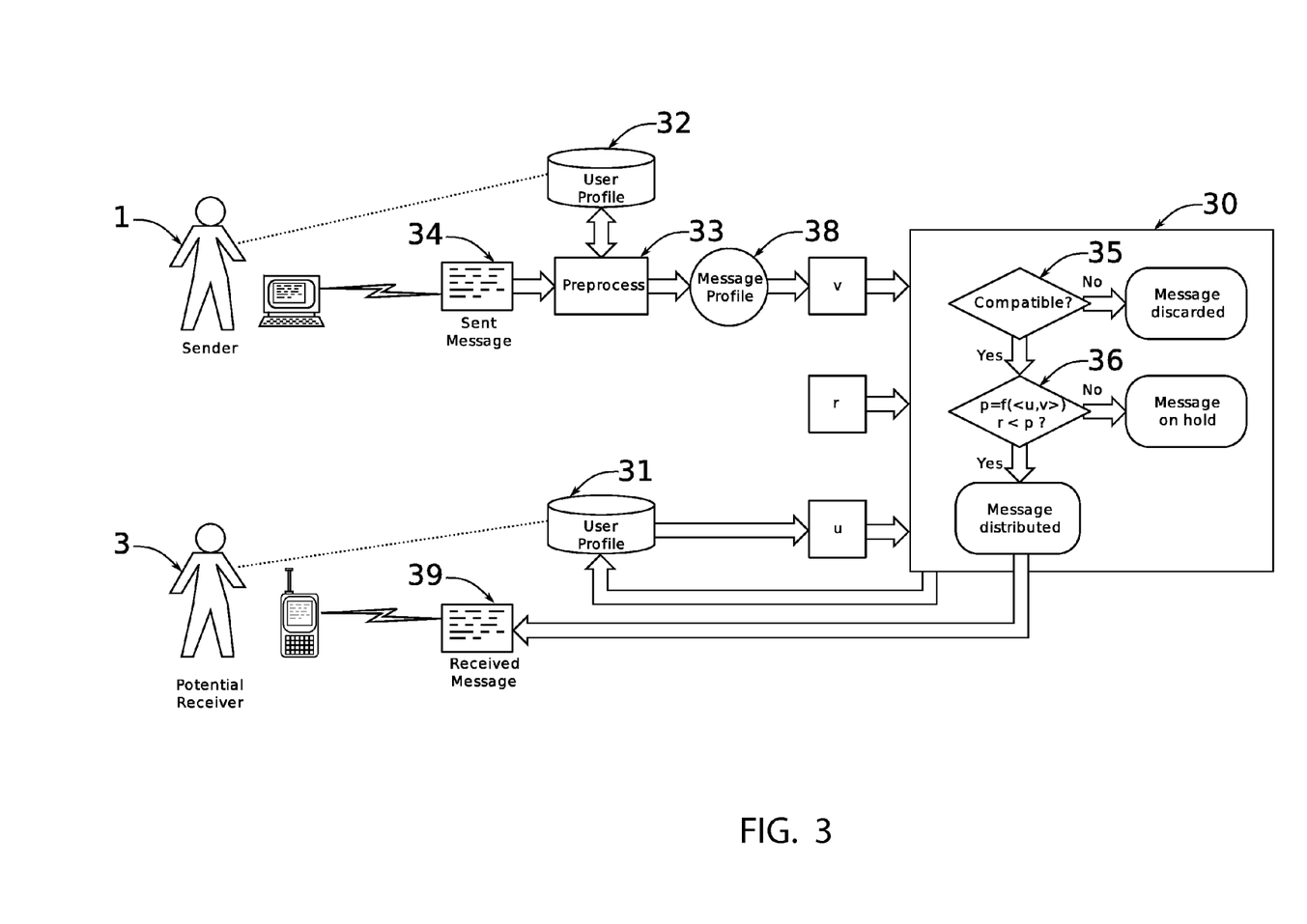
FIG. 3, an example of a dynamic selection function according to the invention.

In the embodiment illustrated in FIG. 3, the features used by the selection function 30 of the receiver 3 are users and topics.

For example, Alice is the sender 1 and Bob is the potential receiver 3. Bob's profile 31 is characterized by the weighted features $<<u>>$ as u=[{alice, 0.8}, {jogging, 0.1}], and Alice message is focused on fishing with weighted feature $<<v>>$ as v=[{alice, 1.0}, {fishing, 1.0}].

If the message language is not in the languages list understood by Bob in Bob's profile, then the message is ignored, as a preliminary compatibility phase (step 35).

Otherwise (step 36), the u. v product having a value p in the range [0,1] and $<<r>>$ being a reference value of such an inner product, for instance r=0.5:
if r<p, then the message is propagated;
if r>p, the message is stored (in stand-by).
In this example p=0.8: so Bob will receive Alice's message 34 enriched with metadata as message 39 with a probability of 80%.

In more elaborated versions, the selection function takes into account other parameters: the incoming flux for each feature as dynamically determined, and feature values and metadata included in any instance of the message.

In the general diagram of FIG. 2, the adaptive process continuously adjusts parameters of the diffusion process, such as the annotation of the connections 234 between nodes, and parameters of the selection process, such as the thresholds used by the selection functions on the user nodes.

The adaptive process also updates information in the user profiles 222, 252 and 262 when messages are sent and received by the respective user nodes, 22, 25 and 26, whether the message is forwarded to the user or not, through connections 280, 282, 283, 223, 287, 265. These modifications result from the user activity and induce changes in the message filtering and selection for the user and, indirectly, the message diffusion process.

If the message 21 is delivered to the user 2 and/or user 3, the sender user 1 is notified and its profile 222 is updated accordingly. This allows the sender to know who did receive the message. The profiles 252 and 262 of the recipient users 2 and 3 are also updated.

In the example described in FIG. 2, the user profile 222 is updated with information:
from the activity of sending the message 21,
the message 21 content itself,
metadata generated by the pre-process modules of the message 21, such as language and topic identification,
the recipients of the message 21.

The profile update is dispatched to the diffusion graphs 23 and 24. The graphs use information from the user profile 222 to distribute the message and modify their own topology.

The user profile, that includes information, for example, about the user regarding the languages they understand, their relationships with other users, their activity and the set of topics they are interested in, is also updated when the user declares to speak/understand a language, when they provide feedback as actions such as rating or answering a given message, subscribing to answers to a message, rating or annotating another user, including blacklisting them or declaring them as a friend.

The profile is also updated from information extracted from other sources, such as an existing social graph, texts written by the user, messages sent on other networks and so on.

OTHER EMBODIMENTS

On other respects, a user profile can also include information on the frequency of messages sent, on the time periods when the user sends messages, on the interfaces the user uses to send and read messages, on the time between the reception of a message and the emission of a reply, on the interactions with other users, on the data extracted from other networks, on the number of discussions the user subscribed to, on the number of topics extracted from the message sent or from the replies, and so on. This information is used by the selection function.

If the message is identified as being in a given language, the information that the user sent a message in this language can be added to the user's profile. Likewise, if the message mentions a particular topic, an interest for the topic is added to the user's profile.

In another embodiment, nodes are Unix processes and the connection between nodes are embodied by TCP or Unix sockets.

In another embodiment, the internal state of feature nodes includes a weight value for each user nodes they are connected with. When a user rates a received message positively, the internal state of the feature nodes that represent the feature values mentioned in the message is updated to increase the weight of the link between these nodes and the user's node. This can raise the probability for the user to receive messages in regards to this feature.

In another embodiment, when a user rates a message positively, the profile of the sender of the message is augmented with information that describes that the recipient user is a fan, possibly increasing the probability of receiving more messages from that user.

In another embodiment, when a user rates a message positively or negatively, the adaptive selection function of their node is modified accordingly.

In another embodiment, the selection function only delivers messages the first time they are received and never puts messages on hold.

In another embodiment, the selection function computes a quality value of the message based on the recipient's profile and the feature values extracted from the message and delivers the message based on a random variable multiplied by the quality value.

The invention not limited to the described embodiments.

The system can be preferably but not only implemented with the Erlang-OTP framework and nodes are Erlang processes spread among several computers. A user node or a feature node can also be composed of one or more Erlang processes. As permitted in particular by Erlang-OTP technology, the system includes a very large number of nodes.

Messages can be sent through several interfaces: a mobile interface with a dedicated client application, for example on a PDA or a smart phone, an e-mail, another social network the system is interfaced with.

Using the recipient profile and information extracted from the message, the selection function filters messages written in a language that the recipient user has never used or declared to understand.

The invention claimed is:

1. Method for delivering messages in a social network to increase a signal-to-noise ratio for recipient users of messages comprising a diffusion process and a selection process in which:
   the diffusion process dispatches each message through routing graphs between sender user and recipient users;
   the selection process locally filters the messages that are transmitted from sender users and received by recipient users, according to the result of the application of a selection function on metadata values constituting a message profile extracted from each transmitted message and feature values constituting a user profile of each recipient;
and characterised in that:
   the diffusion process dispatches each message from sender users to a set of potentially interested recipient users chosen on a basis of features extracted from messages;
   the diffusion process and the selection process are combined in an adaptive process where the selection functions and the routing graphs are continuously adjusted by updates of sender and receiver profiles triggered by user actions and message metadata of exchanged messages.

2. Method for delivering messages according to claim 1 wherein the selection function is based on an inner product between a message vector based on metadata as coordinates extracted from the message profile space and a user vector based on weighed feature values as coordinates of the user profiles space, the maximization being achieved by selecting the inner product values greater than a threshold value.

3. Method for delivering messages according to claim 1, wherein the message profile extracted from the message comprises metadata chosen between at least one list of weighted feature values, a list of users identified in the message, a unique login of the sender user, of the former message in connection with the current message and of the primary message of linked messages, a sequence of characters to identify the software configuration or support used to send the message and the network on which the message is transmitted, the time of the message, Boolean information to indicate the confidentiality degree of the message and its accessibility in another network.

4. Method for delivering messages according to claim 1, wherein at least two types of graphs are used, a topic graph and a user graph, the topic graph diffusing messages according to topics mentioned in the messages and the user graph diffusing messages according to the relationships between users as recorded in user profiles.

5. Method for delivering messages according to claim 1, wherein the graphs are modified according to changes in the content of messages and changes in message flows.

6. Method for delivering messages according to claim 1, wherein a route is created between two users when the rate of messages exchanged between them is greater than a predetermined threshold.

7. Method for delivering messages according to claim 1, wherein the adaptive selection function has at least two outcomes:
   the message is discarded, and if received again it will be discarded as well, as a result, the user will not receive the message unless the user profile is updated to permit the distribution of the message;
   the message is only delivered once and discarded if received again.

8. System for delivering messages in a social network to implement the method according to claim 1, comprising user nodes distributed on several computers, the messages being diffused through a user graph that links sender user nodes and potential recipient user nodes characterised in that messages are filtered according to a selection function and links between nodes are continuously modified, created or destroyed in response to user actions or updates in user profiles or transmission of messages.

9. System for delivering messages according to claim 8, comprising diffusion feature nodes and where messages are diffused through routing graphs sender user nodes can be indirectly connected to recipient user nodes through diffusion feature nodes, characterised in that links between user nodes and feature nodes are continuously modified, created or destroyed in response to updates in user profiles or transmission of messages.

10. System for delivering messages according to claim 8, wherein the routing graphs are dynamically adapted to involve updated features nodes and new feature nodes created from message profiles extracted from newly transmitted messages with a pre-process tool.

11. System for delivering messages according to claim 8, wherein links in routing graphs are created or respectively destroyed when a feature value or a weighted feature value in a user profile raises above a predetermined threshold or respectively decreases below a predetermined threshold.

12. System for delivering messages according to claim 8, wherein a selection feature used in the selection process at the recipient user nodes is chosen between the language and the topics mentioned in the messages.

13. System for delivering messages according to claim 8, wherein each recipient user node comprises two selection functions with different thresholds or parameters, delivering messages through a realtime flow and an asynchronous flow, each delivery happening through different interfaces.

14. System for delivering messages according to claim 8, wherein the combination of the following dynamic adaptive tools of:
   updating the profile of the sender user,
   updating the connections of user nodes with feature nodes,
   updating the connections of user nodes with other user nodes,
   updating the profile of the recipient users and
   adaptive selection of messages,
delivers messages according to automatically identified user interests.

15. Method for delivering messages according to claim 7, wherein the adaptive selection function has at least three outcomes:
   the message is discarded, and if received again it will be discarded as well, as a result, the user will not receive the message unless the user profile is updated to permit the distribution of the message;
   the message is only delivered once and discarded if received again, and
   the message is put on hold, and if received again, the adaptive selection function will consider feature values and metadata included in all instances of the message.

* * * * *